April 2, 1935.  E. J. THOMPSON  1,996,178
ELECTRIC AIR PRESSURE INDICATING DEVICE
Filed March 24, 1933

INVENTOR.
EARL J. THOMPSON.
BY Edward M. Apple
ATTORNEY.

Patented Apr. 2, 1935

1,996,178

UNITED STATES PATENT OFFICE 1,996,178

ELECTRIC AIR PRESSURE INDICATING DEVICE

Earl J. Thompson, Royal Oak, Mich.

Application March 24, 1933, Serial No. 662,434

4 Claims. (Cl. 200—58)

This invention relates to electric air pressure indicating systems to be used on pneumatically tired vehicles and has particular reference to an improved pneumatically operable switch or circuit breaker for such a system.

Figure 1:
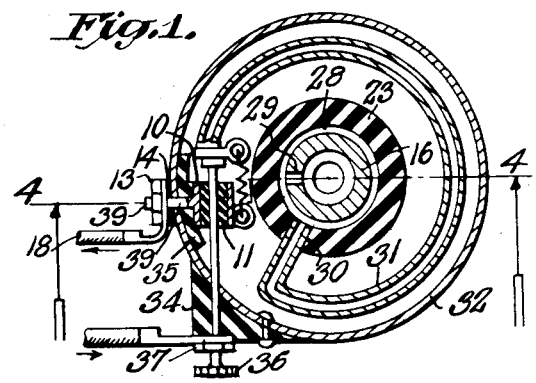

The invention resides in the particular combination and arrangement of parts comprising my device, the preferred embodiment of which is hereinafter described and illustrated in the accompanying drawing, wherein: Fig. 1 is a horizontal sectional view of a device embodying my invention applied to the valve stem of an automobile tire.

Figure 2:
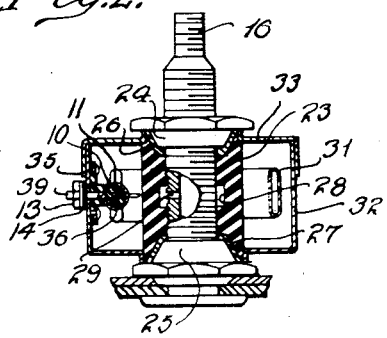

Fig. 2 is a vertical sectional view taken on line 4—4 of Fig. 1.

My device is intended to be used in connection with the single wire circuit usually employed on automobiles.

In the preferred form of my circuit breaker 21, as shown in Fig. 2, I provide an internally threaded nonconductive hollow core 23, which is adapted to screw on to the valve stem 16. The upper and lower ends of the nonconductive hollow core 23 are counterbored to engage the smooth heads of lock nuts 24 and 25. Washers 26 and 27 may be interposed between the lock nuts 24 and 25 and the core 23 to insure air-tightness.

On the inner periphery of the hollow core 23, intermediate its ends, is formed a groove 28, which is adapted to communicate with a transverse passageway 29 drilled through one side of the valve stem 16 and communicate with the interior of the valve stem 16 at a point below the valve core (not shown).

To one side of the core 23, as at 30, is secured the open end of a curved, flattened spring metal tube 31, commonly known as a Bourdon tube. The interior of the tube 31 is adapted to communicate with the groove 28 and the passageway 29.

The core 23 and the tube 31 are enclosed in a tight fitting waterproof housing 32 having a cover 33. Secured to the housing 32 is an insulating block 34, which is adapted to carry one end of the adjusting screw 36. A bushing 10 having a non-conductive core 11 is secured to the housing 32 by means of a threaded stud 39 and a nut 13 and is arranged to support the other end of the adjusting screw 36. The bushing 10 and the nut 13 are respectively insulated from the housing 32 by the insulating block 35 and washer 14. The adjusting screw 36 is calibrated to conform with the range of air pressures normally carried in the tire with which the device is to be used. A lock washer 37 is adapted to secure the adjusting screw 36 in any desired position. A spring 38 electrically connects the free end of the tube 31 to the bushing 10 and is adapted to steady the free end of the tube 31 when the latter is not in contact with the end of the adjusting screw 36. The incoming lead 15 of the circuit attaches to the adjusting screw 36 and the return lead 18 attaches to the threaded stud 39.

The operation of the circuit breaker 21 is simple. The adjusting screw 36 is set at a position indicating the air pressure desired to be maintained in the tire. In this position the adjusting screw 36 and the end of the tube 31 are electrically connected. When the tire is inflated to the desired degree, the air pressure within the tube 31 tends to straighten the tube 31 so that its free end pulls away from the adjusting screw 36, causing a break in the circuit. As the tire becomes deflated the tube 31 tends to resume its normal position of curvature until contact is again made between the tube 31 and the adjusting screw 36, at which stage the circuit is again closed. The closing of the circuit causes a signal to be registered on an indicating panel (not shown) suitably positioned within the car.

Having thus described my invention, what I claim and desire to secure by Letters Patent is:

1. In an air pressure indicating system for an automotive vehicle having wheels and pneumatic tires, an electric switch adapted to be directly attached to and supported by the tire valve stem, said switch comprising a non-conductive tubular core having internal threads adapted to engage the external threads of said valve stem, a Bourdon tube supported at one end by said core, communicating passageways between the interior of said Bourdon tube and said valve stem, a moisture proof housing for said core and said Bourdon tube, electric conductive elements carried by said housing, one element connecting directly to said Bourdon tube, the other element being positioned so as to contact the free end of said Bourdon tube when the latter is in contracted position.

2. In an air pressure indicating system for an automotive vehicle having wheels and pneumatic tires, an electric switch adapted to be directly attached to and supported by the tire valve stem, said switch comprising a non-conductive tubular core having internal threads adapted to engage the external threads of said valve stem, a Bourdon tube supported at one end by said core, said Bourdon tube pneumatically communicating with a peripheral groove extending around the inside of said core, which said groove in turn communicates with the interior of said valve stem, communicating passageways between the interior of said Bourdon tube and said valve stem, a moisture proof housing for said core and said Bourdon tube, electric conductive elements carried by said housing, one element connecting directly to said Bourdon tube, the other element being positioned so as to contact the free end of said Bourdon tube when the latter is in contracted position.

3. In an air pressure indicating system for an automotive vehicle having wheels and pneumatic tires, an electric switch adapted to be directly attached to and supported by the tire valve stem, said switch comprising a non-conductive tubular core having internal threads adapted to engage the external threads of said valve stem, a Bourdon tube supported at one end by said core, communicating passageways between the interior of said Bourdon tube and said valve stem, a moisture proof housing for said core and said Bourdon tube, an electric conductive element extending through said housing and directly connecting to said Bourdon tube, a second conductive element extending through said housing, said second conductive element being adjustable toward and away from the free end of said Bourdon tube and said second conductive element being calibrated to correspond to a desired range of air pressures.

4. In an air pressure indicating system for an automotive vehicle having wheels and pneumatic tires, an electric switch adapted to be directly attached to and supported by the tire valve stem, said switch comprising a non-conductive tubular core having internal threads adapted to engage the external threads of said valve stem, said core having an enlarged counter-sunk recess at each end, lock-nuts adapted to engage said recesses and lock said core to said valve stem, a Bourdon tube supported at one end by said core, communicating passageways between the interior of said Bourdon tube and said valve stem, a moisture proof housing for said core and said Bourdon tube, electric conductive elements carried by said housing, one element connecting directly to said Bourdon tube, the other element being positioned so as to contact the free end of said Bourdon tube when the latter is in contracted position.

EARL J. THOMPSON.